United States Patent
Basavaraj Hamasagar

(10) Patent No.: US 11,732,737 B2
(45) Date of Patent: Aug. 22, 2023

(54) MOUNTING BRACKET

(71) Applicant: Volvo Truck Corporation, Gothenburg (SE)

(72) Inventor: Umesh Basavaraj Hamasagar, Karnataka (IN)

(73) Assignee: Volvo Truck Corporation, Gothenburg (SE)

( * ) Notice: Subject to any disclaimer, the term of this patent is extended or adjusted under 35 U.S.C. 154(b) by 0 days.

(21) Appl. No.: 17/618,914

(22) PCT Filed: Jun. 8, 2020

(86) PCT No.: PCT/EP2020/065885
§ 371 (c)(1),
(2) Date: Dec. 14, 2021

(87) PCT Pub. No.: WO2020/254137
PCT Pub. Date: Dec. 24, 2020

(65) Prior Publication Data
US 2022/0307529 A1    Sep. 29, 2022

(30) Foreign Application Priority Data
Jun. 18, 2019   (IN) .............................. 201941024221

(51) Int. Cl.
*F16B 2/10*    (2006.01)
*B60R 16/02*   (2006.01)
*B60R 16/08*   (2006.01)

(52) U.S. Cl.
CPC ............ *F16B 2/10* (2013.01); *B60R 16/0215* (2013.01); *B60R 16/08* (2013.01)

(58) Field of Classification Search
CPC .................. F16B 2/10; Y10T 24/44274; Y10T 24/44504; Y10T 24/44974; B60R 16/0215
See application file for complete search history.

(56) References Cited

U.S. PATENT DOCUMENTS 2,144,140 A      1/1939   Batcheller
3,154,279 A *   10/1964   Fletcher .................... F16L 3/12
                                                        248/74.1
(Continued)

FOREIGN PATENT DOCUMENTS

CN    204493909 U      7/2015
DE    102006015700 A1  11/2006
(Continued)

OTHER PUBLICATIONS

International Search Report and Written Opinion for International Patent Application No. PCT/EP2020/065885, dated Aug. 26, 2020, 12 pages.

*Primary Examiner* — Robert Sandy
(74) *Attorney, Agent, or Firm* — Withrow & Terranova, PLLC

(57) ABSTRACT

A mounting bracket for securing a pneumatic hose or electrical wire harness to a vehicle frame portion. The bracket comprises first and second opposing jaw members configured movable in a direction against each other to clamp onto the vehicle frame portion, tightening means for forcing the first jaw member against the second jaw member to secure the mounting bracket to the vehicle frame portion, and at least one supporting member for supporting the pneumatic hose or electrical wire harness, wherein the first and second opposing jaw members are integrally formed and connected via a resilient bending portion, whereby the tightening means force the first jaw member against the second jaw member by bending the resilient bending portion.

11 Claims, 3 Drawing Sheets

(56) References Cited

U.S. PATENT DOCUMENTS

| | | | | |
|---|---|---|---|---|
| 3,177,542 A | * | 4/1965 | James | H02G 7/10 |
| | | | | 24/535 |
| 3,796,405 A | | 3/1974 | Rystad | |
| 4,097,169 A | * | 6/1978 | Kelly | F16G 11/048 |
| | | | | 24/135 R |
| 4,455,716 A | * | 6/1984 | Leonardo | F16G 11/06 |
| | | | | 24/703.1 |
| 2018/0245716 A1 | | 8/2018 | Nijdam et al. | |

FOREIGN PATENT DOCUMENTS

| | | | |
|---|---|---|---|
| FR | 2510830 | A1 | 2/1983 |
| SE | 527223 | C2 | 1/2006 |

* cited by examiner

MOUNTING BRACKET

This application is a 35 USC 371 national phase filing of International Application No. PCT/EP2020/065885, filed Jun. 8, 2020, which in turn claims priority to Indian Patent Application No. 201941024221, filed Jun. 18, 2019, the disclosures of which are incorporated herein by reference in their entireties.

TECHNICAL FIELD

The present disclosure relates to mounting brackets for holding electrical harnesses, pneumatic tubes, hoses and various multimedia routing in relation to a vehicle frame.

The invention can be applied in heavy duty vehicles, such as trucks, buses, and construction equipment.

BACKGROUND

Heavy duty vehicles such as trucks and semi-trailer vehicles comprise a large number of cables and hoses connecting various vehicle parts such as hoses for pneumatic systems, electrical harnesses for electrical systems, and fuel lines for vehicle propulsion systems. These cables and hoses often need to be routed some distance along the vehicle frame, and therefore need to be securely attached to the vehicle frame.

Traditionally, mounting brackets are attached to the vehicle frame by bolting. However, this way of securing cables and hoses to the vehicle frame is inconvenient since new bolt holes are required whenever a bracket is moved due to redesign in cable or hose routing, or due to relocation of vehicle components like gear box and engine.

SE-527223 C2 discloses a cable holder adapted for clamping onto a vehicle frame ledge. The cable holder comprises a jaw arranged pivotable about a pivot joint and configured to clamp against a clamping surface. This mounting bracket therefore does not need holes drilled in the vehicle frame for bolting since it uses a clamping mechanism instead of the traditional bolting. The device is, however, relatively complex and expensive to manufacture.

There is a need for less complicated mounting brackets possible to manufacture at reduced cost.

SUMMARY

It is an object of the present disclosure to provide improved mounting brackets, and also methods for assembling mounting brackets, as well as manufacturing methods for producing the improved mounting brackets.

This object is obtained by a mounting bracket for securing routing media such as a pneumatic hose or an electrical wire harness to a vehicle frame portion. The bracket comprises first and second opposing jaw members configured movable in a direction against each other to clamp onto the vehicle frame portion, tightening means for forcing the first jaw member against the second jaw member to secure the mounting bracket to the vehicle frame portion, and at least one supporting member for supporting the pneumatic hose or electrical wire harness. Notably, the first and second opposing jaw members are integrally formed and connected via a resilient bending portion, whereby the tightening means force the first jaw member against the second jaw member by bending the resilient bending portion.

This way a mounting bracket is provided which can be freely moved along, e.g., a ledge of a vehicle frame portion. The mounting bracket does not require holes drilled in the vehicle frame portion for use with bolts to attach the mounting bracket. Also, the mounting bracket allows for an efficient assembly method and is therefore cost efficient, since are no hinges and other moving parts involved in the integrally formed first and second opposing jaw members.

According to some aspects, the first and second opposing jaw members and the bending portion are integrally formed in sheet metal. Sheet metal provides for mechanical robustness and also a measure of resilience, thereby providing a cost efficient yet effective mounting bracket design. The sheet metal is suitable or laser cutting into shape, which is an advantage.

According to some other aspects, the first and second opposing jaw members and the bending portion are integrally formed in spring steel, whereby the first and second opposing jaw members are biased towards an open un-clamped configuration. The spring steel provides a stronger biasing force compared to, e.g., sheet metal. This biasing force may simplify mounting and moving the clamp since the claim is biased towards the un-clamped configuration.

According to certain aspects, at least one of the opposing surfaces of the jaw members comprises a friction enhancing surface treatment. The friction enhancing surface treatment provides an improved holding force, whereby the mounting bracket obtains a better holding force with respect to the vehicle frame portion. The surface treatment may comprise any of grip tape, rubber, machined teeth or the like.

According to other aspects, the mounting bracket comprising an ear portion extending in an extension direction of the first and second jaw members and in a plane perpendicular to a plane of the second jaw member. This ear portion is arranged to support a pneumatic hose or electrical wire harness in a direction perpendicular to an extension direction of the vehicle frame portion.

This way the options for securing electrical harnesses or tubes to the bracket is increased in number, which is an advantage. Also, the ear portion provides an option for securing electrical harnesses and the like which extend in directions perpendicular to a ledge to which the mounting bracket has been clamped.

According to aspects, the at least one supporting member is arranged to receive a Christmas-tree cable tie holder. This type of cable holder is convenient in that it can be easily attached and removed from the bracket, e.g., during vehicle assembly.

According to aspects, the at least one supporting member comprises a protrusion for supporting the pneumatic hose or electrical wire harness against a gravitational force and/or vibration caused by vehicle operation. This way the securing of the pneumatic hose or electrical wire harness to a vehicle frame portion becomes even stronger and more robust.

According to aspects, the tightening means comprises a press screw fixedly attached to the mounting bracket and arranged to force the first jaw member against the second jaw member. It is an advantage that there are no loose parts comprised in the mounting bracket which can be lost, and which must be kept track of.

The object is also obtained by an assembly method for securing a pneumatic hose or electrical wire harness to a vehicle frame portion. This method comprises providing a mounting bracket according to the above discussion. The method also comprises clamping the mounting bracket onto the vehicle frame portion and securing the pneumatic hose or electrical wire harness to the supporting member of the mounting bracket.

According to aspects, the clamping and/or securing is performed when the vehicle frame portion is in an up-side down configuration. This improves access to the vehicle frame portion an enables a more convenient assembly operation.

The object is furthermore obtained by a manufacturing method for producing a mounting bracket. The method comprises forming a sheet metal portion comprising first and second jaw members parts connected via a bending portion part, bending the sheet metal portion about a bending portion axis of the bending portion part such that the first jaw member part faces the second jaw member part, bending the first jaw member part about an axis parallel to the bending portion axis, thereby forming a first jaw member. The method also comprises bending the second jaw member part about an axis parallel to the bending portion axis in the same direction as the first jaw member part, thereby forming a second jaw member configured movable in a direction against the first jaw member, and attaching tightening means to allow forcing the first jaw member against the second jaw member to clamp onto a vehicle frame portion.

The disclosed manufacturing method is efficient and cost effective yet yields a mounting bracket which is both robust and easy to use.

There are also disclosed herein vehicles associated with the above-mentioned advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present invention will become apparent when studying the appended claims and the following description. The skilled person realizes that different features of the present invention may be combined to create embodiments other than those described in the following, without departing from the scope of the present invention.

BRIEF DESCRIPTION OF THE DRAWINGS

With reference to the appended drawings, below follows a more detailed description of embodiments of the invention cited as examples. In the drawings.

DETAILED DESCRIPTION OF EXAMPLE EMBODIMENTS OF THE INVENTION

Figure 1:
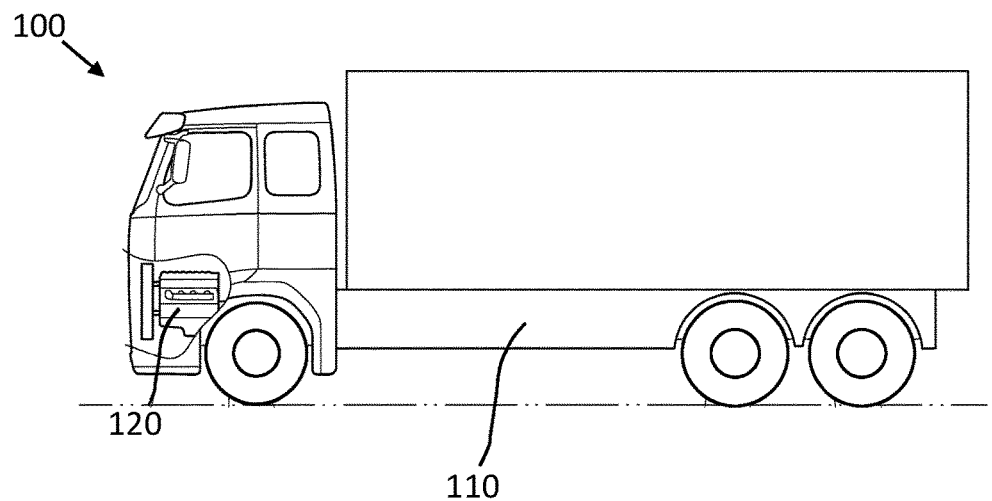
FIG. 1 illustrates a vehicle.

The invention will now be described more fully hereinafter with reference to the accompanying drawings, in which certain aspects of the invention are shown. This invention may, however, be embodied in many different forms and should not be construed as limited to the embodiments and aspects set forth herein; rather, these embodiments are provided by way of example so that this disclosure will be thorough and complete, and will fully convey the scope of the invention to those skilled in the art. Like numbers refer to like elements throughout the description.

It is to be understood that the present invention is not limited to the embodiments described herein and illustrated in the drawings; rather, the skilled person will recognize that many changes and modifications may be made within the scope of the appended claims.

FIG. 1 schematically illustrates a vehicle 100 built around a vehicle frame 110 and powered by a power source 120, here shown as a combustion engine. The vehicle 100 comprises a large number of different systems for operating the vehicle. In addition to the power source 120 which requires fuel lines and control cabling, there are often pneumatic systems which require pneumatic hoses to be routed along the vehicle frame. The vehicle 100 also comprises an electrical system. The electrical system connects various electrical sources, such as batteries and generators, to power consumers, via electrical cabling such as electrical harnesses. Such connections are generally referred to herein as routing media.

Traditionally, different types of mounting brackets are used to secure these cables, hoses, and tubes to the vehicle frame. Each type of connection media, i.e., cable, hose, tube, or pipe, often has a uniquely shaped mounting bracket associated with it, which cannot be re-used with other types of connection media.

Traditional mounting brackets are attached to the vehicle frame by drilling holes in the vehicle frame and securing the mounting bracket to the vehicle frame using bolts. This makes the connection media routing complicated to change, since the holes cannot easily be adapted.

Figure 2:
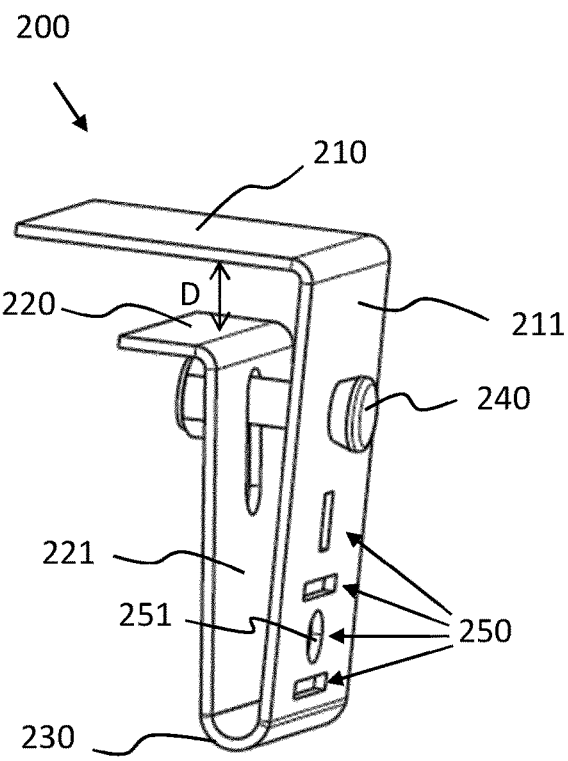
FIGS. 2-3 show example mounting brackets.

FIG. 2 shows an example mounting bracket 200 for securing a pneumatic hose or electrical wire harness to a vehicle frame portion 110. The bracket comprises first and second opposing jaw members 210, 220 configured movable in a direction against each other to clamp onto the vehicle frame portion 110. In FIG. 2, the first jaw member 210 has a slightly longer extension compared to the second bracket, but this is not necessary. The first and second jaw members 210, 220 extend more or less in parallel planes separated by a distance D. The distance D is preferably configured in dependence of a ledge thickness associated with the vehicle frame 110. I.e., the distance D should be large enough to allow a portion of the vehicle frame to enter the gap formed between the first and the second jaw members.

The first jaw member 210 is connected at an angle to a first leg member 221. Similarly, the second jaw member 220 is connected at an angle to a second leg member 221. The first and the second leg members have end sections which are connected at the ends distal from the respective jaw members.

The mounting bracket comprises at least one supporting member 250 for supporting the pneumatic hose or electrical wire harness. This supporting member is shown in FIG. 2 as a configuration of holes configured to receive, e.g., a cable tie. However, other types of supporting member can be used together with the mounting bracket within scope of the present disclosure.

The mounting bracket 200 also comprises tightening means 240 arranged to force the first jaw member 210 against the second jaw member 220 to secure the mounting bracket 200 to the vehicle frame portion 110. By bending the first leg member 221 towards the second leg member 211, the distance D between the first and the second jaw member decreases. Thus, if there is an inserted portion of vehicle frame in the gap between the first and the second jaw member, then this vehicle frame portion will be squeezed between the first and the second jaw member. This squeezing creates a holding force which secures the mounting bracket to the vehicle frame portion. In other words when the tightening means operate on the leg members to push the leg members against each other, the leg members pivot about the connected ends, thereby moving the first jaw member against the second jaw member.

Thus, the first and second opposing jaw members 210, 220 are integrally formed and connected via a resilient bending portion 230, whereby the tightening means force the first jaw member 210 against the second jaw member 220 by bending the resilient bending portion.

The mounting bracket offers several advantages and effects compared to known mounting brackets;

Since the mounting bracket is clamped onto the vehicle frame portion and not bolted, it can be moved freely and re-positioned in response to a media routing re-design.

The mounting bracket can be used to secure a plurality of different routing media or various dimensions. There is no need for a specific mounting bracket for each type of routing media.

The mounting bracket can be efficiently mounting onto a vehicle frame portion by gently pushing it onto a ledge and securing it by means of the tightening means. It is releasably fastened in the sense that it can be removed at any time by simply releasing the tightening means.

Different orientations are possible for the hoses/harness routed through it.

Hoses/Harness can be branched to the required direction without overlapping the hoses/harnesses.

Chaffing of hoses/harness can be avoided.

Shape of the clamp may provide space to pass 3 or more rows of bundles and can be branched to the desired location.

Cable tie slots are provided on the clamp secure the bundles to the clamp.

Figure 5:
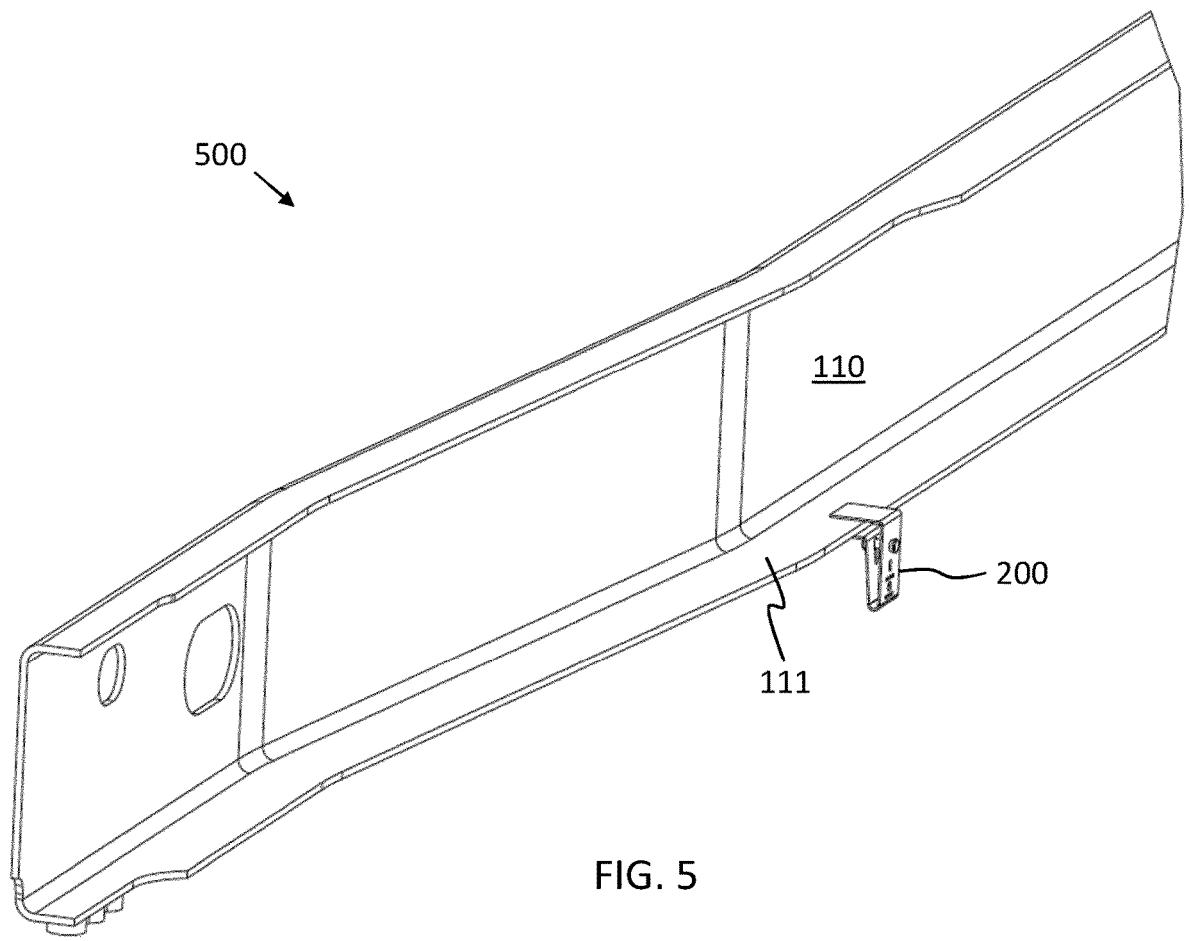
FIGS. 5-6 show vehicle frame portions with example mounting brackets.

FIG. 5 shows an example vehicle frame portion 110 with a mounting bracket 200. It is realized that this type of mounting bracket does not require holes drilled into the vehicle frame and can therefore be moved freely along the vehicle frame portion ledge 111 to which it has been attached. Thus, if media routing on the vehicle is re-designed for some reason, the mounting brackets can just be shifted to the new locations without the need for drilling new holes or changing any other mounting bracket configurations. Since the mounting brackets are adapted for use with cable ties, new cable ties can be provided in case dimensions on some type of media changes. Consequently, the disclosed mounting bracket is associated with a large degree of design freedom, which is an advantage.

Figure 6:
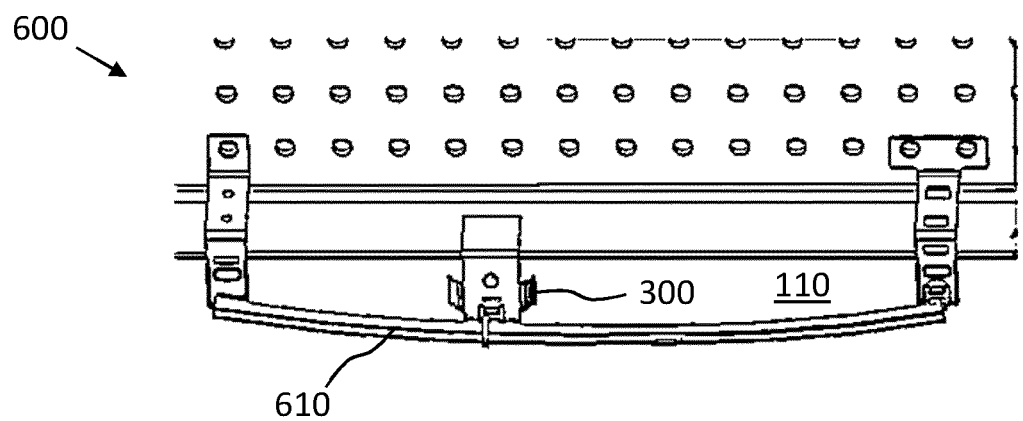

FIG. 6 shows another example 600 of the mounting bracket 300 used for securing media 600 to a vehicle frame portion 110.

According to one example, the tightening means 240 may comprise a press screw fixedly attached to the mounting bracket 200, 300 and arranged to force the first jaw member 210 against the second jaw member 220. This way there are no loose parts on the mounting bracket which can be misplaced or lost during the vehicle assembly process, which is an advantage. Also, the press screw provides some leverage, thereby simplifying installing the mounting bracket.

Figure 3:
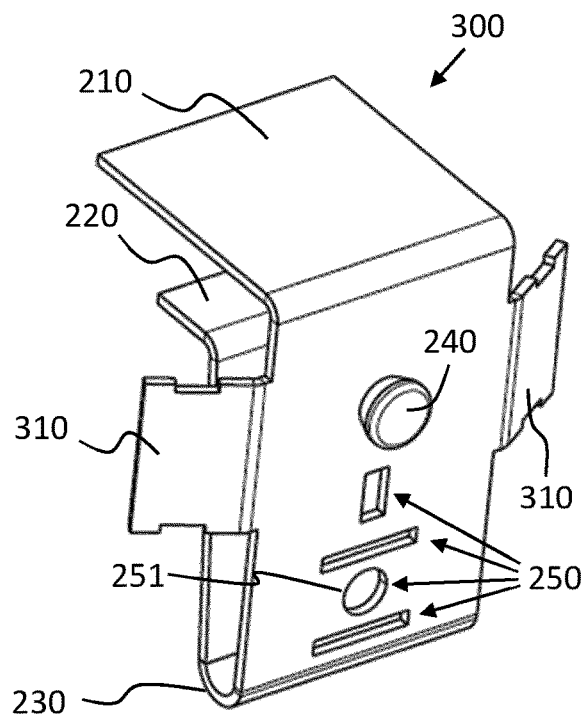

FIG. 3 shows another example mounting bracket 300. This mounting bracket comprises an ear portion 310 extending in an extension direction of the first and second jaw members 210, 220 and in a plane perpendicular to a plane of the second jaw member 220. The ear portion 310 is arranged to support a routing media 610 in a direction perpendicular to an extension direction of the vehicle frame portion 110. Such a routing media 610, i.e., pneumatic hose or electrical wire harness or the like, can be attached to the ear portion by means of, e.g., a cable tie or the like. The ear portion allows routing in directions perpendicular to a vehicle frame portion ledge, which is an advantage.

Various materials can be used to form the mounting bracket 200, 300, for instance, the first and second opposing jaw members 210, 310 and the bending portion 230 may be integrally formed in sheet metal. Thus, the main part of the mounting bracket is formed by a single piece of sheet metal having a shape resembling an extended rectangular section of sheet metal. The piece of sheet metal first forms the first jaw member 210, it is then bent along an axis perpendicular to the extension direction of the piece of sheet metal at about 90 degrees to form the first leg member 211. The piece of sheet metal is then bent again perpendicularly to the extension direction of the piece of sheet metal at about 180 degrees to form the second leg member 221. Finally, the second jaw member 220 is formed by again bending the piece of sheet metal at about 90 degrees such that the first jaw member 210 is approximately parallel to the second jaw member 220.

The sheet metal may for example be about 2 mm thick steel plate.

According to some aspects, the first and second opposing jaw members 210, 220 and the bending portion 230 are integrally formed in spring steel, whereby the first and second opposing jaw members 210, 220 are biased towards an open un-clamped configuration. By forming the mounting bracket in spring steel, the bending portion becomes more resilient, and is able to provide an increased bias towards an un-clamped position. This embodiment of the mounting bracket is somewhat similar to a paper clip which is instead biased towards a clamped position.

To further improve on the clamping and holding ability of the mounting bracket, at least one of the opposing surfaces of the jaw members 210, 220 may optionally comprise a friction enhancing surface treatment. This friction enhancing treatment may, e.g., be a rubber coating or a coating of some other friction enhancing material such as silicon or the like. The surface treatment may also comprise an abrasive tape or compound which provides grip against a metal surface such as that of most vehicle frame portions 110. The surface treatment may also comprise machined teeth configured to grip onto the vehicle frame portion and hold the mounting bracket in position.

Figure 4:
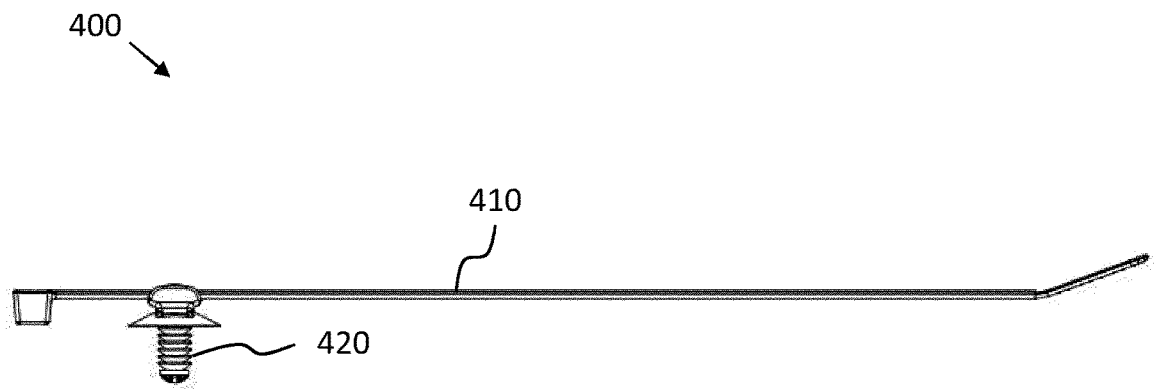
FIG. 4 schematically illustrates a cable tie with a Christmas tree fastener.

FIG. 4 shows an example cable tie with a Christmas-tree cable tie holder 420. Such cable tie holders are known and will therefore not be discussed in more detail herein. Looking at the supporting members illustrated in FIGS. 2 and 3, the cable tie holder is arranged to be received in the hole 251 formed in the mounting bracket. Thus, a cable tie may be releasably attached to the mounting bracket 200, 300 in a convenient yet secure manner.

The cable tie can then be used to secure any type of electrical harness, hose, or other routing media to the vehicle frame portion 110.

One or more supporting members 250 may optionally also be formed as a protrusion (not shown in FIG. 2 or in FIG. 3) for supporting routing media 610 against a gravitational force and/or vibration caused by vehicle operation.

Figure 8:
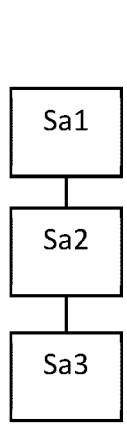
FIGS. 8-9 are flow charts illustrating methods.

FIGS. 5 and 6 illustrate example assembly methods for securing routing media 610 to a vehicle frame portion 110. With reference to FIG. 8, the method comprises providing Sa1 a mounting bracket 200, 300 according to the discussions herein, clamping Sa2 the mounting bracket 200, 300 onto the vehicle frame portion 110, and securing Sa3 the routing media 610 to a supporting member 250 of the mounting bracket 200, 300.

Advantageously, but optionally, the clamping and/or securing is performed when the vehicle frame portion 110 is in an up-side down configuration. This way access to the vehicle frame portion is improved.

Figure 7:
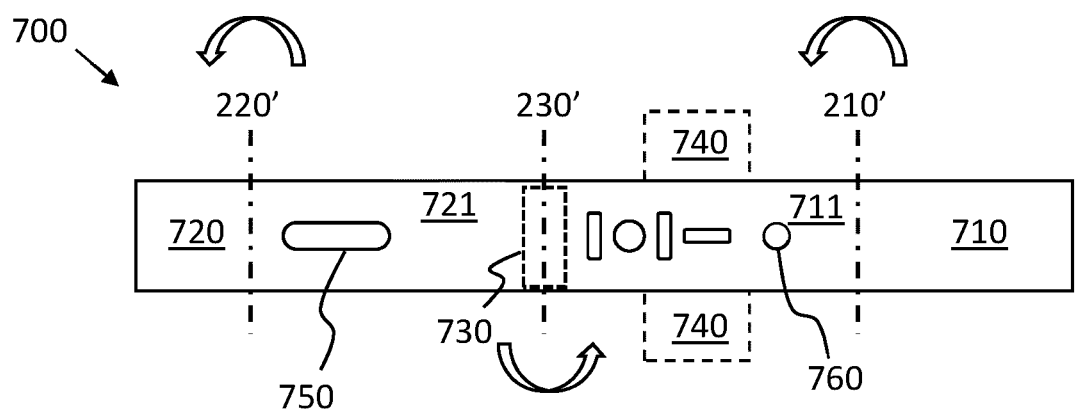
FIG. 7 schematically illustrates a sheet metal portion.
Figure 9:
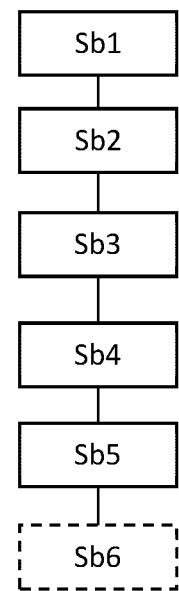

FIG. 9 is a flow chart schematically illustrating a manufacturing method for producing a mounting bracket 200, 300 according to the discussions above. With reference to FIG. 7, the method comprises forming Sb1 a sheet metal portion 700 comprising first 710 and second 720 jaw members parts connected via a bending portion part 730. The jaw member parts are connected to the bending part via leg members 711, 721.

The forming may, e.g., be done using laser cutting or punching. Either represent cost effective methods of obtaining the sheet metal portion.

The method also comprises bending Sb2 the sheet metal portion 700 about a bending portion axis 230' of the bending portion part 730 such that the first jaw member part 710 faces the second jaw member part 720, and also bending Sb3 the first jaw member part 710 about an axis 210' parallel to the bending portion axis 230', thereby forming a first jaw member 210. The manufacturing method then comprises bending Sb4 the second jaw member part 720 about an axis 220' parallel to the bending portion axis 230' in the same direction as the first jaw member part 710, thereby forming a second jaw member 220 configured movable in a direction against the first jaw member 210, and attaching Sb5 tightening means 240, 750, 760 to allow forcing the first jaw member 210 against the second jaw member 220 to clamp onto a vehicle frame portion 110.

As mentioned above, the sheet metal portion is optionally a sheet spring metal portion.

As mentioned above, the sheet metal portion 700 optionally comprises at least one ear portion 740 extending in a direction perpendicular to an extension direction of the sheet metal portion.

According to some aspects, the method comprises applying Sb6) a friction enhancing surface treatment to at least one of the opposing surfaces of the first and the second jaw members 210, 220.

The invention claimed is:

1. A mounting bracket for securing routing media to a vehicle frame portion, the mounting bracket comprising:
   first and second opposing jaw members integrally formed and connected via a resilient bending portion, the first and second opposing jaw members configured to be movable in a direction against each other to clamp onto a vehicle frame portion,
   a tightener configured to force the first jaw member against the second jaw member to secure the mounting bracket to the vehicle frame portion, and
   at least one supporting member configured to support a pneumatic hose or electrical wire harness, and
   an ear portion extending in an extension direction of the first and second jaw members and in a plane perpendicular to a plane of the second jaw member, the ear portion configured to support routing media in a direction perpendicular to an extension direction of the vehicle frame portion,
   wherein the tightener is configured to force the first jaw member against the second jaw member in response to the resilient bending portion being bent.

2. The mounting bracket of claim 1, wherein the first and second opposing jaw members and the bending portion are integrally formed in sheet metal.

3. The mounting bracket of claim 1, wherein the first and second opposing jaw members and the bending portion are integrally formed in spring steel, whereby the first and second opposing jaw members are biased towards an open un-clamped configuration.

4. The mounting bracket of claim 1, wherein:
   at least one opposing surface of opposing surfaces of the first and second opposing jaw members comprises a friction enhancing surface treatment.

5. The mounting bracket of claim 1, wherein the at least one supporting member is arranged to receive a Christmas-tree cable tie holder.

6. The mounting bracket of claim 1, wherein the tightener comprises a press screw fixedly attached to the mounting bracket and configured to force the first jaw member against the second jaw member.

7. An assembly method for securing routing media to a vehicle frame portion, comprising:
   providing a mounting bracket, the mounting bracket comprising:
      first and second opposing jaw members integrally formed and connected via a resilient bending portion, the first and second opposing jaw members configured to be movable in a direction against each other to clamp onto a vehicle frame portion,
      a tightener configured to force the first jaw member against the second jaw member to secure the mounting bracket to the vehicle frame portion, and
      at least one supporting member configured to support a pneumatic hose or electrical wire harness, and
      an ear portion extending in an extension direction of the first and second jaw members and in a plane perpendicular to a plane of the second jaw member, the ear portion configured to support routing media in a direction perpendicular to an extension direction of the vehicle frame portion,
      wherein the tightener is configured to force the first jaw member against the second jaw member by bending the resilient bending portion,
   clamping the mounting bracket onto the vehicle frame portion, and
   securing the routing media to a supporting member of the mounting bracket.

8. The assembly method of claim 7, wherein the clamping and/or securing is performed when the vehicle frame portion is in an up-side down configuration.

9. A manufacturing method for producing a mounting bracket, comprising:
   forming a sheet metal portion comprising first and second jaw members parts connected via a bending portion part, the sheet metal portion comprising at least one ear portion extending in a direction perpendicular to an extension direction of the sheet metal portion,
   bending the sheet metal portion about a bending portion axis of the bending portion part such that the first jaw member part faces the second jaw member part,
   bending the first jaw member part about an axis parallel to the bending portion axis, thereby forming a first jaw member,
   bending the second jaw member part about an axis parallel to the bending portion axis in a same direction as the first jaw member part, thereby forming a second jaw member configured to be movable in a direction against the first jaw member, and attaching tightening means to allow forcing the first jaw member against the second jaw member to clamp onto a vehicle frame portion.

10. The manufacturing method of claim 9, wherein the sheet metal portion is a sheet spring metal portion.

11. The manufacturing method of claim 9, further comprising applying a friction enhancing surface treatment to at least one opposing surface of opposing surfaces of the first and the second jaw members.

\* \* \* \* \*